Figure 1:
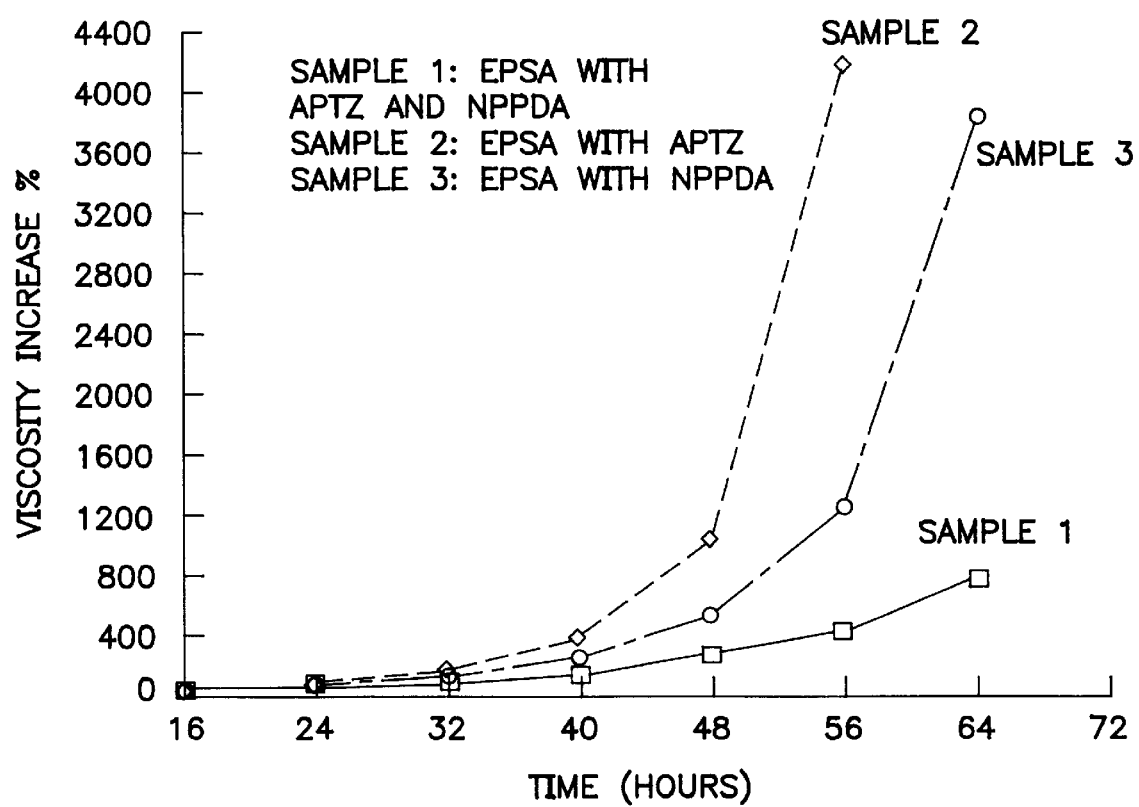

United States Patent [19]
Kapuscinski et al.

[11] Patent Number: 5,942,471
[45] Date of Patent: Aug. 24, 1999

[54] DISPERSANT AND ANTIOXIDANT VI IMPROVERS BASED ON OLEFIN COPOLYMERS CONTAINING PHENOTHIAZINE AND AROMATIC AMINE GROUPS

[75] Inventors: Maria Magdalena Kapuscinski, Carmel; Robert Thomas Biggs, Walden, both of N.Y.

[73] Assignee: Ethyl Corporation, Richmond, Va.

[21] Appl. No.: 07/907,078

[22] Filed: Jul. 1, 1992

[51] Int. Cl.$^6$ .................................................. C10M 151/04
[52] U.S. Cl. .......................... 508/251; 508/221; 525/256; 525/259
[58] Field of Search ........................ 252/46.7, 47, 47.5; 525/256, 259; 508/251, 221

[56] References Cited

U.S. PATENT DOCUMENTS

| | | | |
|---|---|---|---|
| 3,869,394 | 3/1975 | Daniels et al. | 252/47.5 |
| 4,089,794 | 5/1978 | Engel et al. | 252/51.5 A |
| 4,137,185 | 1/1979 | Gardiner et al. | 252/51.5 A |
| 4,144,181 | 3/1979 | Elliott et al. | 252/47.5 |
| 4,146,489 | 3/1979 | Stambaugh et al. | 252/51.5 A |
| 4,320,019 | 3/1982 | Hayashi | 252/51.5 A |
| 4,340,689 | 7/1982 | Joffrion | 252/51.5 A |
| 4,357,250 | 11/1982 | Hayashi | 252/51.5 A |
| 4,380,007 | 4/1983 | Chafetz et al. | 252/51.5 A |
| 4,693,838 | 9/1987 | Varma et al. | 525/256 |
| 4,764,304 | 8/1988 | Kapuscinski et al. | 252/51.5 A |
| 4,767,553 | 8/1988 | Hart et al. | 252/47.5 |
| 4,780,228 | 10/1988 | Gardiner | 525/256 |
| 4,790,948 | 12/1988 | Liu et al. | 252/47.5 |
| 4,820,776 | 4/1989 | Kapuscinski et al. | 525/279 |
| 4,952,637 | 8/1990 | Kapuscinski et al. | 525/256 |
| 5,073,278 | 12/1991 | Schumacher et al. | 252/47.5 |
| 5,075,383 | 12/1991 | Migdal et al. | 252/47.5 |
| 5,147,569 | 9/1992 | DeRosa et al. | 252/47.5 |

*Primary Examiner*—Jerry D. Johnson
*Attorney, Agent, or Firm*—Dennis H. Rainear; Thomas Hamilton

[57] ABSTRACT

Multifunctional viscosity index improvers for lubricating oils based on a hydrocarbon polymer holding pendant functional groups containing phenothiazine, and pendant functional groups containing aromatic amine antioxidant.

7 Claims, 1 Drawing Sheet

DISPERSANT AND ANTIOXIDANT VI IMPROVERS BASED ON OLEFIN COPOLYMERS CONTAINING PHENOTHIAZINE AND AROMATIC AMINE GROUPS

BACKGROUND OF THE INVENTION

This invention relates to a novel multi-functional lubricant additive which is a dispersant, anti-oxidant and a anti-wear viscosity index (VI) improver additive when employed in a lubricating oil composition.

It is well known to those skilled in the art, that hydrocarbon lubricating oils must be formulated by addition of various additives to improve their properties.

In the case of lubricating oils, typified by those employed in railway, automotive, aircraft, marine etc., service, it is found that they become degraded during use due inter alia to formation of sludge which may be generated by deterioration of the oil or by introduction of undesirable components from other sources including the fuel or the combustion air. In order to maintain and improve the properties of the lubricating oil, various additives have heretofore been provided; and these have been intended to improve the viscosity index, dispersancy, oxidative stability, antiwear properties, etc.

Reduction in cost of lubricating oils and its improved performance can be achieved by using a VI improver which improves not only viscosity index, but is also active as dispersant and antioxidant. Such an additive can be prepared by incorporating dispersant and antioxidant units onto polymer base, typically olefin copolymer (OCP), backbone. The engine test performance of motor oils containing such multifunctional VI improvers is superior to the oils containing commercial monofunctional or dispersant OCP VI improvers and allow a significant reduction in the amount of classical antioxidant and dispersant used in the dispersant/inhibitor packages.

DISCLOSURE STATEMENT

The art contains many teachings on the use of polymer additives in lubricating oil compositions. Ethylene-propylene copolymers and ethylene-alpha olefin non-conjugated diene terpolymers which have been further derivatized to provide bifunctional properties in lubricating oil compositions illustrate this polymer type of oil additive.

U.S. Pat. No. 3,522,180 discloses a method for the preparation of an ethylene-propylene copolymer substrate effective as a viscosity index improver for lubricating oils.

U.S. Pat. No. 4,089,794 discloses ethylene copolymers derived from ethylene and one or more ($C_3$ to $C_{28}$) alpha olefin solution grafted with an ethylenically-unsaturated carboxylic acid material followed by a reaction with a polyfunctional material reactive with carboxyl groups, such as a polyamine, a polyol, or a hydroxylamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graph monomer of C-vinylpyridine or N-vinylpyrrolidone to provide a dispersant VI improver for lubricating oils.

U.S. Pat. No. 4,820,776 discloses lubricants and fuel oils of improved properties containing ethylene-propylene copolymer derived with N-vinyl pyrrolidone and phenothiazine.

U.S. Pat. No. 4,320,019 discloses a multipurpose lubricating additive prepared by the reaction of an interpolymer of ethylene and a ($C_3$–$C_8$) alpha-monoolefin with an olefinic carboxylic acid acylating agent to form an acylating reaction intermediate which is then reacted with an amine.

U.S. Pat. No. 4,764,304 discloses a lubricating oil dispersant VI improver composition containing an additive prepared by the reaction of an olefin copolymer and an unsaturated isocyanate to form reactive intermediate which is then reacted with heterocyclic amines.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoamine-polyamine mixture.

U.S. Pat. No. 4,382,007 discloses a dispersant—VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxylamine and finally reacted with an alkaryl sulfonic acid.

The disclosures in the forgoing patents which relate to VI improvers and dispersants for lubricating oils, namely U.S. Pat. Nos. 3,522,180, 4,089,794, 4,137,185, 4,144,181, 4,146,489, 4,320,019, 4,340,689, 4,357,250, and 4,382,007, 4,820,776, 4,764,304 are incorporated herein by reference.

An object of this invention is to provide a novel derivatized polymer which imparts viscosity index improving, dispersant, antioxidant and antiwear activity to lubricating oil compositions. This polymer contains pendant groups derivetized from a reactive intermediate which is reacted with amino alkylphenothiazine and an aromatic amine antioxidant.

SUMMARY OF THE INVENTION

The multifunctional OCP VI improvers which impart dispersant and antioxidant properties to motor oils are subjects of our invention. They are prepared by attaching two antioxidants to the polymeric chain: aromatic amine and phenothiazine. Since these antioxidants inhibit oxidative decomposition process by various mechanisms, they form a synergistic antioxidant mixture as proved by the Seq. III-E engine test results included to this application.

Randomly distributed polymer-bound antioxidants function very effectively and provide superior performance over a physical mixture of antioxidant and polymer. Unlike most conventional antioxidants, bound antioxidants are highly resistant from removal from their polymeric substrates by volatilization at high temperatures or by extraction with fluids. Bound antioxidant resist migration and do not precipitate out to form sludge or dirtiness in oil. Their solubility in oil is ensured. The antioxidants, due to their structure, inhibit oxidation processes by two mechanisms. For example, the aromatic amine antioxidants scavenge the radicals while sulfur containing antioxidants decompose hydroperoxides. The favorable antioxidation effect arising from use of the mixture of the above type of antioxidants is known.

In the invention, the polymer is bonded with two antioxidants of different structure in order to accomplish the synergism in the antioxidation activity of the polymer. We attached into the polymer aromatic amine (radical scavenger) and phenothiazine (radical scavenger and hydroperoxide decomposer). The polymer concentrated solution of this polymer are lubricant additives, viscosity index improvers (VI improvers) which provide dispersant and antioxidant activity in motor oils.

The present invention is directed to multifunctional VI improvers based on a polymer prepared by grafting olefin copolymers being a polymer base with monomer containing reactive groups such as anhydride, epoxide, isocyanate or azlactone, then post-reacted with two antioxidant amines: aminoalkylphenothiazine (APTZ) and an aromatic amine such as N-phenyl-p-phenylene diamine (NPPDA).

The multifunctional VI improvers are made in a two-step process. First, an unsaturated monomer is grafted onto polymer under elevated temperature with addition of a free radical initiator. The grafting reaction is followed by reaction with amines.

The novel reaction product of the invention preferably is prepared using ethylene-propylene copolymer (EPM) or ethylene-propylene diene terpolymer (EPDM) as a polymer base, maleic anhydride as a unsaturated monomer.

The lubricant additive of the present invention comprises an oil of lubricating viscosity and an effective amount of the novel reaction product. The lubricating oil will be characterized by having viscosity index improver, dispersancy, antiwear and antioxidant properties.

In the drawings: Figure I is a graph of the viscosity increase rate of samples of 10W-30 oils containing 6.5 wt. % of VI improver in a Sequence IIIE engine test.

DESCRIPTION OF THE INVENTION

This invention as discussed briefly above, is directed to a polymer comprising an oil-soluble, substantially linear, carbon-carbon backbone polymer bearing functional and units thereon, derived from an unsaturated monomer containing reactive groups such as maleic anhydride, glycidyl methacrylate, isocyanatoethyl methacrylate or vinyl azlactone and two antioxidant amines: amino alkylphenothiazine and an aromatic amine.

The charge polymer which may be employed in the practice of the present process of this invention may include an oil-soluble, substantially linear, carbon-carbon backbone polymer. Typical carbon-carbon backbone polymers, prepared from monomers bearing an ethylenically unsaturated polymerizable double bond, which may be employed include homopolymers or copolymers prepared from a monomer containing the grouping

including C=C—R"—C=C
wherein A may be a hydrogen, hydrocarbon such as alkyl, aryl (particularly phenyl) etc., —OOCR typified by acetate or less preferred acyloxy (typified by —OOCR), halide, epoxy etc. R" may be divalent hydrocarbon typified alkylene, alkarylene, cycloalkylene, arylene, etc.

The polymer or copolymer substrate employed in the novel additive of the invention may be prepared from ethylene and propylene or it may be prepared from ethylene and a higher olefin within the range of $C_3$ to $C_{10}$ alpha-monoolefins. The polymer or copolymer substrate may be also prepared from isoprene, styrene or butadiene.

More complex polymer substrates often designated as interpolymers may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, vinylnorbornene, 5-methylene-2-norborene, 1,5-heptadiene, and 1,6-octadiene. A mixture of more than one diene can be used in the preparation of the interpolymer.

The polymer and copolymers prepared from the above mentioned monomers having short and long branches or star shape structure may also be employed.

The preferred carbon-carbon backbone polymers include those selected from the group consisting of ethylene-propylene copolymers (EPM or EPR) and ethylene-propylene-diene terpolymers (EPDM or EPT).

When the charge polymer is an ethylene-propylene copolymer (EPM), it may be formed by copolymerization of ethylene and propylene under known conditions preferably Ziegler-Natta reaction conditions. The preferred EPM copolymers contain units derived from the ethylene in amount of 40–90 mole %, preferably 55–80 mole %, say 59 mole %, the remainder being derived from propylene.

The molecular weight $\overline{M}_n$ of the EPM copolymers which may be employed may be about 5,000 to about 1,000,000, preferably about 5,000 to about 200,000, and most preferably about 80,000. The molecular weight distribution may be characterized by $\overline{M}_w/\overline{M}_n$ of less than about 15, preferably 1.2–10, say 1.8.

When the charge polymer is ethylene-propylene-diene terpolymer (EPT or EPDM), it may be formed by copolymerization of ethylene, propylene, and diene monomers. The diene monomer is commonly a non-conjugated diene typified by dicyclopentadiene; 1.4-hexadiene; ethylidene norbornene or vinyl norbornene. Polymerization is effected under known conditions generally comparable to those employed in preparing the EPM products. The preferred terpolymers contain units derived from ethylene in amount of 40–90 mole %, preferably 50–65 mole %, say 59 mole % and units derived from propylene in an amount of 20–60 mole %, preferably 30–50 mole %, say 41 mole % and units derived from diene third monomer in amount of 0.2–15 mole %, preferably 0.3–3 mole %, say 0.5 mole %. The molecular weight $\overline{M}_n$ of the terpolymers may typically be about 5,000 to about 500,000, preferably about 20,000 to about 200,000, and most preferably about 80,000. Molecular weight distribution of the useful polymers is preferably narrow viz a $\overline{M}_w/\overline{M}_n$ of typically less than 10, preferably 1.5–5, say about 2.2.

THE GRAFT FUNCTIONAL MONOMER

It is a feature of the process of this invention that the graft functional monomers which may be employed (within a polymeric configuration) may be characterized by the presence of units containing an ethylenically unsaturated carbon-carbon double bond and anhydride, epoxide, isocyanate aldehyde or azlactone group. Although the graft monomer may contain more than one ethylenically unsaturated carbon-carbon double bond or reactive group in a preferred embodiment it may contain one of each. Graft monomers containing more than one ethylenically unsaturated carbon-carbon double bond are much less preferred because of the high probability of cross-linking during subsequent reaction.

According to the present invention, the following graft functional monomers may be used:

maleic anhydride
glycidyl methacrylate
allyl glycidyl ether
isocyanatoethyl methacrylate
croton aldehyde
vinyl azlactone
vinyl benzyl chloride It is a feature of the process of this invention that the graft functional monomer may be grafted onto carbon-carbon backbone polymers.

The product graft polymer may be characterized by the presence of pendant reactive groups bonded to the polymer backbone thorough the residue of the graft monomer.

Typically the graft product polymer may by contain 0.1–20, say 0.4 units derived from graft monomer per 1000 carbon atoms of the charge backbone polymer.

THE AMINE REACTANTS

In practice of the present process, the graft polymer bearing pendant reactive groups may be reacted with an amino alkyl phenothiazine and an aromatic amine such as N-phenyl-p-phenylene diamine.

The amine alkyl phenothiazine may be characterized by the following formula:

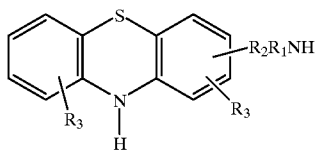

where $R_1$ is a hydrogen or an organic radical which may contain linear, cyclic, heterocyclic or heteroaromatic units which may contain one or more atom of oxygen, nitrogen sulfur or phosphorous;

$R_2$ is an organic group which may contain linear, cyclic, heterocyclic or heteroaromatic units which may contain one or more atom of oxygen, nitrogen, sulfur or phosphorous; and $R_3$ is an organic group which may contain linear, cyclic, heterocyclic or heteroaromatic units which may contain one or more atom or oxygen, nitrogen, sulfur or phosphorous.

THE AMIDIZATION REACTION

Amidization may be carried out by adding the graft polymer containing reactive groups to a reaction vessel together with inert-diluent solvent. In the preferred embodiment, reaction may be carried out in the same solvent and in the same reaction medium as that in which the polymer is dissolved.

The amines, typically amino alkyl phenothiazine and N-phenyl-p-phenylene diamine is added to the reaction vessel. The amount of amine added is preferably 0.1–5 moles, say 1.2 moles per mole of reactive group bonded to the polymer or reactive functional monomer charged. Typically this may correspond to 0.05–0.5 moles, preferably 0.008 to 0.18 moles of amine per 100 g of polymer. The molar ratio of amino alkyl phenothiazine to N-phenyl-p-phenylene diamine is from 0.2 to 5.

The amidization reaction is carried out over 0.1–20 hours, say 4 hours at 60° C.–300° C., say 170° C. with agitation. For ease of handling, the final product may be diluted to form a solution of 4–20 parts, say 13 parts of polymer in 80–95, say 87 parts of mineral oil such as a SUS 100 oil typified by SNO-100.

It is a feature of this invention that the so-prepared polymer solution in oil may find use in lubricating oils as multifunctional additive (e.g. viscosity index improvers which provide dispersancy, antioxidancy and antiwear properties, etc) when present in effective amount of about 1.0 to about 20 wt %, preferably 3–15 wt %, preferably about 9 wt %.

Lubricating oils in which the multifunctional additives of this invention may find use may include automotive, aircraft, marine, railway, etc., oils; oils used in spark ignition or compression ignition; summer or winter oils, etc. Typically the lubricating oils may be characterized by a b.p. of about 570° F. to about 660° F., preferably 610° F.; an e.p. of about 750° F. to about 1200° F., preferably 1020° F.; an API gravity of about 25 to about 31, preferably about 29.

A typical lubricating oil in which the polymer of this invention may be present may be a standard SAE 5W-30 hydrocarbon motor oil formulation having the composition as set forth below in Table IV:

TABLE IV

| | Wt % |
|---|---|
| Base Oil | 82 |
| Viscosity Index Improver (additive of this invention) (10 w % ethylene-propylene copolymer in 90% inert oil) | 9 |
| Standard Additive Package: Polyisobutenyl $(M1290)_n$ succinimide (dispersant); calcium sulfonate (detergent); Zinc dithiophosphate (anti-wear); di-nonyl diphenyl amine (anti-oxidant); 4,4'-methylene-bis (2,6-di-t-butyl phenol) (antioxidant) | 9 |

Use of the additive of this invention makes it possible to readily increase the viscosity index by 25–40 units, say 35 units and to obtain improved ratings on the tests measuring the dispersancy of the system. The viscosity index is determined by ASTM Test D-445.

The present invention comprises making dispersant antiwear and/or antioxidant VI improvers by derivatizing hydrocarbon polymers such as ethylene-propylene copolymer (EPM), or ethylene-propylene-diene terpolymer (EPDM) with, e.g., graft reactive monomer and two amines: aminoalkylphenothiazine and N-phenyl-p-phenylenediamine.

Addition of the above invention additives, to a lubricating oil, may be facilitated by use of a concentrate containing about 1 to about 20 wt. %, preferably about 4 to about 14 wt % of polymer.

The tests and analysis used, according to the present invention, are provided below.

TESTS AND ANALYSIS

1. Oxidation Stability

The antioxidant activity of the new multifunctional VI improver was examined by a proprietary test called Bench Oxidation Test (BOT). In this test, the polymer solution is diluted with SNO-130 oil. The mixture is heated with stirring and air agitation. Samples are withdrawn periodically for analysis, by differential infrared analysis (DIR), to observe changes in the intensity of the carbonyl vibration band at 1710 cm$^{-1}$. Higher carbonyl group intensity indicates a lower thermal oxidative stability of the sample. The result reported, as oxidation index, indicates the change in the intensity of the carbonyl vibration band at 1710 cm$^{-1}$ after 144 hours of oxidation. A lower rating indicates better thermal oxidative stability of the mixture.

2. Dispersancy

The sample is blended into a formulated oil, not containing a dispersant, to form 10.0 wt. % viscosity index improver solution. That blend is tested for dispersancy in the prototype Bench VE Test. In this test, the turbidity of an oil containing an additive is measured after heating the test oil to which has been added a standard blow-by. The result correlates with dispersancy and is compared to three standards (Excellent, Good, and fair) tested simultaneously with the test sample. The numerical rating decreases with an increase in dispersant effectiveness. Results above 100 indicate that the additive does not provide dispersant activity.

3. Antiwear Properties

Antiwear performance of a new VI improver were determined by Four-Ball Wear Test (MS-82-79, ASTM D-2266, ASTM4172). The VI improver solutions in formulated oil, having Kinematic Viscosity at 100° C. around 16 Cst were evaluated.

In this test four balls are arranged in an equilateral tetrahedron. The lower three balls are clamped securely in a test cup filled with lubricant and the upper ball held by a chuck which is motor driven causing the upper ball to rotate against the fixed lower balls. Load is applied in an upward direction through a weight/lever arm system. Heaters allow operation at elevated oil temperatures. The test speeds available for each tester are 600 rmp, 1200 rmp and 1800 rpm. Results are reported as average scar diameter (mm).

The amount of reactive graft monomers and amines incorporated onto OCP in the two-step process is determined by IR-analysis of isolated rubber. The rubber is isolated from solution by multiple precipitation using cyclohexane as a solvent and acetone as precipitator. The rubber (isolated as a solid) is dried in vacuum at 60° C for 36 hours.

4. The Sequence IIIE Engine Test

The ASTM Sequence IIIE test is used to evaluate an engine oil's ability to (a) withstand oxidative oil thickening and (b) protecting engine parts against high temperature wear and deposits.

This test uses a 1987 Buick 3.8L V.6 engine equipped with jacketed rocker covers and a jacketed crankcase breather tube. The engine is also equipped with a special camshaft and lifters to aid in wear discriminating among oils of various performance level. The engine is run for 64 hours at high speed, heavy load and high temperatures to simulate a full size car pulling a trailer at highway speeds.

The results for viscosity increase presented in FIG. 1 are the average values from two runs for each oil of the same composition.

In order to illustrate the present invention and its advantages, the following Examples are provided.

EXAMPLE 1

100 g of EPM containing 0.9 wt % succinic anhydride groups (EPSA) is dissolved in 400 g of mineral SNO-100 oil by heating with mixing at 155° for 3 hours under nitrogen blanket.

1.50 g of amine alkyl phenothiazine (APTZ) and 1.2 g of N-phenyl-p-phenylene (NPPDA) which are dissolved in 29 g of Surfonic L24-7 are charged. The mixture is heated with stirring under nitrogen for 4 hours at 165° C.

Then, the solvent neutral oil (SNO-100) is added to give a solution containing 13.0 wt % polymer. This solution is used for further testing.

EXAMPLE 2

In this example, the procedure of the example 1 is followed except that 3.0 g of APTZ and no NPPDA is charged.

EXAMPLE 3

In this example, the procedure of the example 1 is followed except that 2.4 g of NPPDA and no APTZ is charged.

EXAMPLE 4*

In this example, 13.0 wt % EPM solution in mineral oil with addition of Surfonic L24-7 is prepared. 100 g of EPM which is used in the example 1, is added to 600 g of SNO-100 and 29 g of Surfonic L24-7. The mixture is heated to 155° C. with stirring and under nitrogen for 3 hours until the rubber is completely dissolved.

RESULTS

The evaluation data for the samples of Examples 1,2,3 and 4* are listed below in Table I and Figure I. The sample numbers are related to the example numbers.

As seen in the Table I samples of Examples 1,2, and 3 containing rubber with incorporated phenothiazine and/or NPPDA units show good dispersant activity. The reference sample of example 4* containing unmodified rubber does not show any dispersant properties.

In Figure I, the viscosity increase rate of 10W-30 oils containing 6.5 wt % of VI improver (sample 1, sample 2 or sample 3) in Sequence IIIE engine test is shown (average results from two runs of the same oils). As seen in FIG. 1, the 10W-30 oil with sample 1 containing rubber capped with both aminoalkyl phenothiazine and N-phenyl-p-phenylene diamine gave significantly lower viscosity increase results in Seq. III-E Engine Test than the 10W-30 oils with sample 2 based on rubber capped with APTZ only or oils with sample 3 based on rubber capped with NPPDA only. After 64 hours of engine test duration, viscosity of oil containing the sample 1 is 5 times or more lower then the viscosity of oils containing the sample 2 or the sample 3. The viscosity increase is related to the oxidation rate of oils during the test. Therefore, these results indicate that APTZ and NPPDA form a synergistic antioxidant composition.

TABLE I

| BENCH DISPERSANCY OF VI IMPROVER SAMPLE | | | | |
|---|---|---|---|---|
| SAMPLE | 1 | 2 | 3 | 4* |
| MATERIAL WT PARTS | | | | |
| EPSA (1) | 100 | 100 | 100 | — |
| EPM (2) | — | — | — | 100 |
| Aminoalkyl phenothiazine (APTZ) | 1.5 | 3.0 | — | — |
| N-phenyl-p-phenylene diamine (NPPDA) | 1.2 | — | 2.4 | — |
| Surfonic L24-7 (3) | 29 | 29 | 29 | 29 |
| Diluent Oil | 600 | 600 | 600 | 600 |
| BENCH DISPERSANCY (BVET test) | | | | |
| Result | 50 | 37 | 60 | 200 |
| Standards | 32/38/100 | 35/65/108 | ------------> | |

(1) Ethylene propylene copolymer containing succinic anhydride groups
(2) Ethylene propylene copolymer
(3) Surface-Active Agent (ethoxylated linear alcohol).

We claim:

1. A hydrogen backbone polymer holding two types of antioxidant groups which form synergistic antioxidant composition comprising pendant functional groups containing phenothiazine antioxidant and pendant functional groups containing aromatic amine antioxidant.

2. The polymer of claim 1 wherein said pendant functional group containing phenothiazine is derived from alkylamino phenothiazine, and said pendant functional group containing aromatic amine antioxidant is derived from N-phenyl-p-phenylene diamine.

3. The polymer of claim 1 wherein said pendant functional groups are attached to the polymer by the reaction of their derivatives with the polymer containing reactive groups selected from the group consisting of anhydride, epoxide, isocyanate, chloride, azlactone, and ketone.

4. The polymer of claim 1 wherein the amount of said pendant functional groups is 0.01 to 5 moles per 1000 carbon atoms of the polymer.

5. The polymer of claim 1 wherein said polymer backbone is ethylene-propylene copolymer or ethylene-propylene-diene terpolymer.

6. A lubricating oil additive comprising a major portion of lubricating oil and minor portion of a polymer as claimed in claim 1 which is effective as a multifunctional viscosity index improver in motor oils.

7. A lubricating oil containing 0.1 to 5 wt. % of a polymer as claimed in claim 1.

* * * * *